Nov. 22, 1938.  G. MOUNTJOY  2,137,475
SIGNAL SELECTOR CIRCUITS
Filed May 4, 1936  4 Sheets-Sheet 1

INVENTOR
GARRARD MOUNTJOY
BY
ATTORNEY

Nov. 22, 1938.   G. MOUNTJOY   2,137,475
SIGNAL SELECTOR CIRCUITS
Filed May 4, 1936   4 Sheets-Sheet 2

INVENTOR
GARRARD MOUNTJOY
BY
H.G. Grover
ATTORNEY

Nov. 22, 1938. G. MOUNTJOY 2,137,475
SIGNAL SELECTOR CIRCUITS
Filed May 4, 1936 4 Sheets-Sheet 3
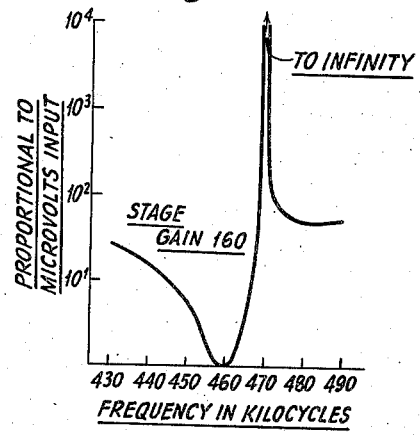
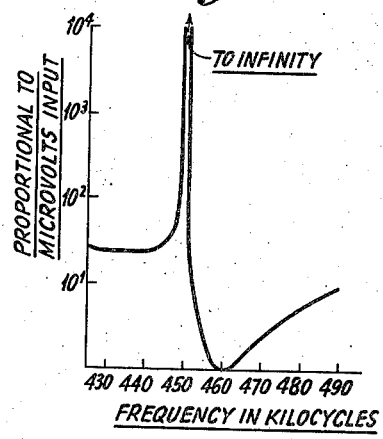
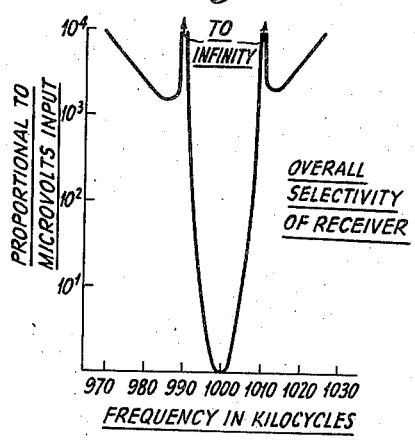
INVENTOR
GARRARD MOUNTJOY
BY
ATTORNEY Nov. 22, 1938.  G. MOUNTJOY  2,137,475
SIGNAL SELECTOR CIRCUITS
Filed May 4, 1936  4 Sheets-Sheet 4
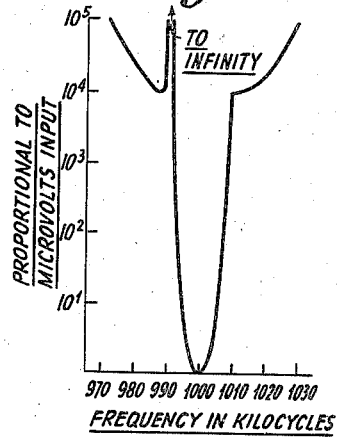
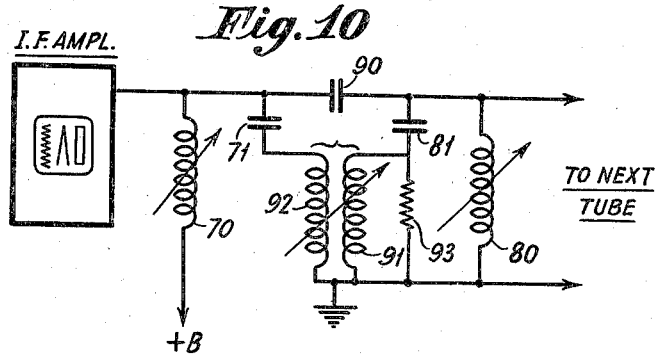
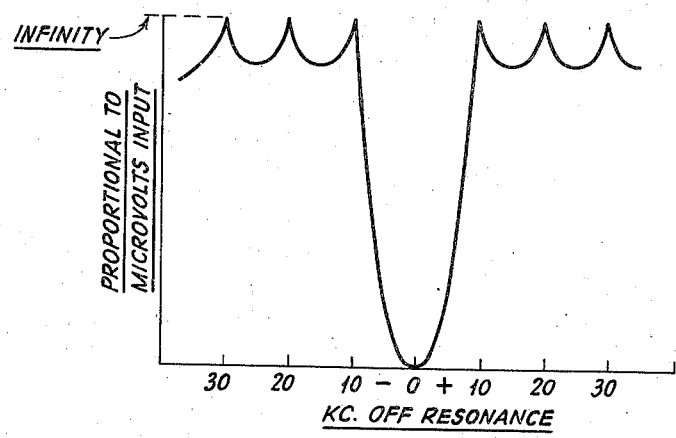
INVENTOR
GARRARD MOUNTJOY
BY
ATTORNEY Patented Nov. 22, 1938

2,137,475

UNITED STATES PATENT OFFICE 2,137,475

SIGNAL SELECTOR CIRCUITS

Garrard Mountjoy, Bayside, Long Island, N. Y., assignor to Radio Corporation of America, a corporation of Delaware Application May 4, 1936, Serial No. 77,655

8 Claims. (Cl. 178—44)

My present invention relates generally to signal selector circuits, and more particularly to tuned selector circuits having infinite attenuation for undesired adjacent channel signals.

Radio receivers of present day construction utilize a series of resonant selector circuits, and these circuits function to attenuate those signals which do not conform to the operating resonant frequency to which the receiver has been tuned. Signals far from resonance undergo much more attenuation than those close to resonance by virtue of this cascading effect. For example, in a conventional superheterodyne receiver employing two tuned radio frequency circuits followed by four I. F. circuits, operating at 460 kc., the rejection for signals 20 kc. off resonance is about 55 times greater than the rejection 10 kc. off resonance. If the 20 kc. selectivity may be considered just comfortably adequate, then the 10 kc. selectivity (55 times less in voltage rejection, and 3025 times less in power) has limited merit.

As is well known to those engaged in the problem of designing superheterodyne receivers for use under present day broadcast conditions, the receiver should be designed to be practically immune from the effects of adjacent channel interference. At the same time the I. F. selector circuits, which circuits are those depended upon to impart high selectivity to the superheterodyne receiver, must not be designed so as to in any way render the construction of the receiver too expensive.

Accordingly, it may be stated that it is one of the main objects of my present invention to provide signal selector circuits for radio receivers, and which selector circuits are preferably of the I. F. type adapted to operate at a fixed I. F. value, the selector circuits being designed to present infinite rejection of undesired adjacent channel interference; the infinite attenuation of undesired signals being accomplished at a predetermined distance from resonance, the latter distance being 10 kc. under present day broadcast conditions.

Another important object of this invention is to provide a signal transmission network of the type comprising at least two cascaded circuits tuned to a common carrier frequency, the tuned circuits being reactively coupled by at least two reactances which are related in such a manner that substantially infinite attenuation of at least one adjacent channel is secured, and that impedance being provided in at least one of the tuned circuits to insure proper power factor correction of the network.

Another object of this invention is to provide an I. F. transmission network for a superheterodyne receiver, which network includes at least two cascaded resonant circuits, both cascaded circuits being tuned to the operating I. F., but the first of the circuits being designed to reject substantially completely one adjacent undesired signal channel, and the following circuit being constructed to reject the adjacent channel on the opposite side of resonance.

Yet another object of my invention is to provide an I. F. selector network for a superheterodyne receiver, and which network may be disposed between at least two signal transmission tubes following the first detector, the selector network being tuned to the operating I. F. of the receiver, and comprising cascaded tuned circuits related in such a manner as to reject both adjacent channels on either side of resonance.

And still other objects of the invention are to improve generally the selectivity and transmission efficiency of coupled signal selector circuits, and more especially to provide selector circuits of substantially complete rejectivity against adjacent channel interference, and which selector circuits are not only economical and simple to construct, but are also readily assembled in radio receivers.

The above general objects of my invention are to be construed and interpreted in the light of the following detailed description of the invention: but it is to be clearly understood that the various circuit arrangements, and descriptions thereof, are given merely by way of illustration and example, and are therefore not to be considered limiting the scope of the present invention as expressed in the claims.

In the drawings:

Fig. 5 is the attenuation characteristic for the first I. F. selector network at 460 kc.:

Fig. 6 is the characteristic for the second I. F. selector network at 460 kc.:

Fig. 7 shows the overall selectivity characteristic of a receiver of the type illustrated in Fig. 1:

Fig. 9 illustrates the overall selectivity characteristic of a superheterodyne receiver embodying a selector network of the type shown in Fig. 8:

Fig. 10 illustrates another modification of the invention:

Fig. 11 illustrates the overall selectivity characteristic of a transmission network embodying cascaded selector networks, of the type shown in Fig. 1 or Fig. 8 and wherein the cascaded networks reject adjacent channel interference at different frequencies.

Figure 1:
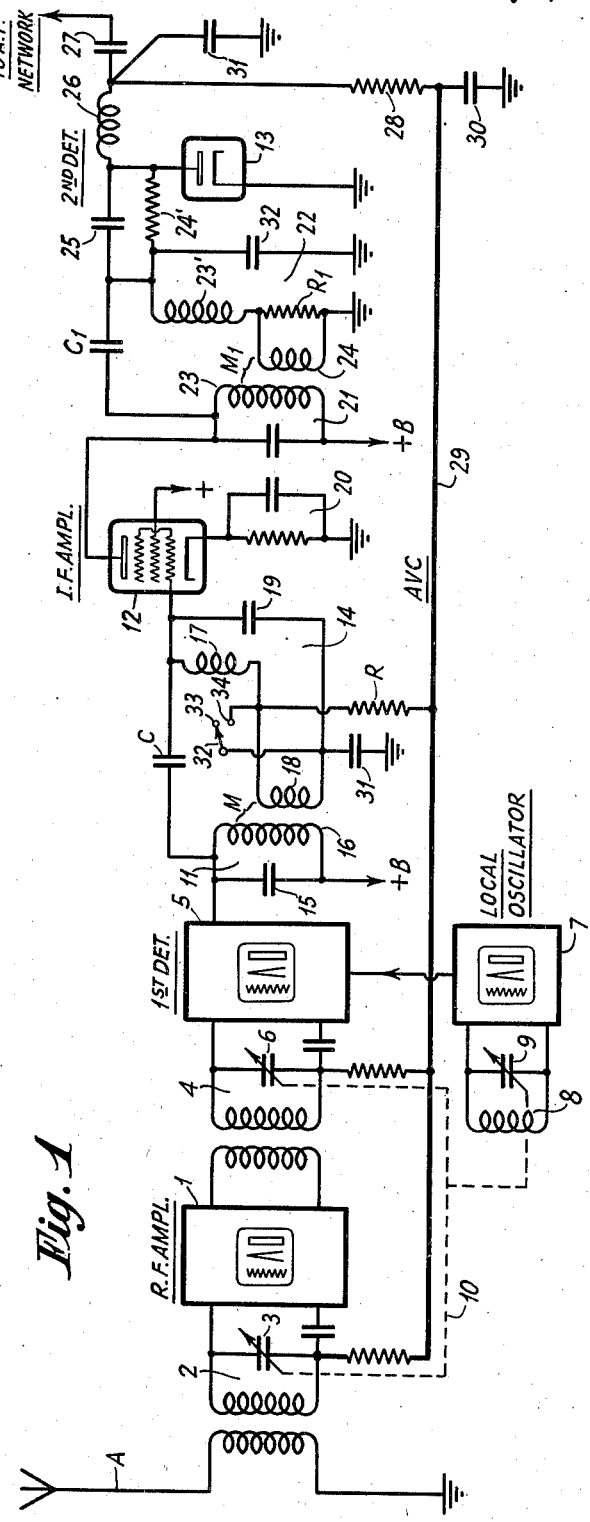
Fig. 1 is a circuit diagram of a superheterodyne receiver embodying one form of my invention.

Referring now to the accompanying drawings, wherein like reference characters in the different figures designate similar circuit elements, there is shown in Fig. 1 a superheterodyne receiver of the type generally comprising a signal collector A, and the latter may be of the grounded antenna type, or it may be a radio frequency distribution line, or even the usual signal collector employed on an automobile radio receiver. A radio frequency amplifier 1 has its tunable input circuit 2 coupled to the collector A. The input circuit includes the usual type of tuning condenser 3, and the output of the amplifier 1 is impressed upon the tunable input circuit 4 of the following first detector, or converter, tube 5. The input circuit 4 includes a variable tuning condenser 6, and there is impressed upon the first detector locally produced oscillations from the local oscillator 7. The oscillator tank circuit 8 includes a variable tuning condenser 9, and the dotted line 10 denotes the mechanical uni-control device which varies the position of the rotors of the three variable condensers in unison.

Those skilled in the art are fully acquainted with the manner of constructing this portion of a superheterodyne receiver, and of the fact that the three tunable circuits are so related that the energy appearing in the output circuit 11 of the first detector has a frequency value equal to that of the operating I. F. This I. F. value may be chosen from a range of 75 to 460 kc., and the frequency of the oscillator tank circuit 8 must constantly differ from the frequency of the signal circuits 2 and 4 by a value equal to the frequency value of the I. F. It is to be clearly understood that instead of using separate tubes 5 and 7, a tube of the pentagrid converter type (2A7) may be used to provide a combined local oscillator-first detector network. The I. F. output circuit 11 is followed by an I. F. amplifier tube 12, which may be of the pentode type; and the latter is followed by the second detector, or demodulator, 13.

Between the I. F. output circuit 11 and the input electrodes of amplifier 12 there is disposed the tuned circuit 14, and the latter is tuned to the operating I. F. The circuit 11 comprises the coil 16, and the shunt tuning condenser 15; the tuned circuit 14 comprising the coil 17 and the link coupling coil 18, coils 17 and 18 having connected in shunt therewith the tuning condenser 19. The condenser C connects the high alternating potential sides of the circuits 11 and 14, and provides a capacity coupling path between the cascaded tuned circuits. Inductive coupling is provided between the circuits by the coupling between coils 16 and 18, and this coupling is denoted by the symbol M. The cathode circuit of amplifier 12 includes the usual signal grid biasing network 20, and the I. F. output circuit 21 is connected to the plate of the amplifier 12.

Figure 2:
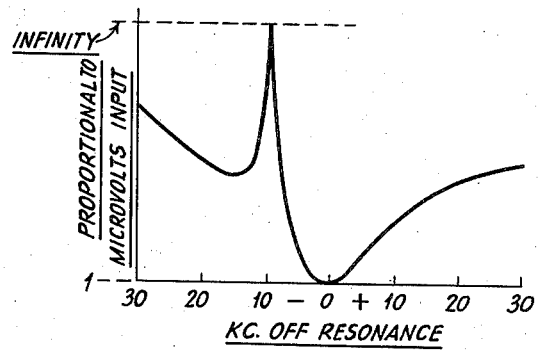
Fig. 2 shows the adjacent channel attenuation characteristic for the first I. F. selector network in Fig. 1.

The coupling M is so poled that the voltage induced through M is opposite in sign to the voltage induced through the capacity coupling C. Furthermore, these voltages are made to cancel at an adjacent channel off the I. F. In Fig. 2 there is shown the type of selectivity characteristic secured with the network disposed between tubes 5 and 12. This characteristic is secured by plotting "Kc. off resonance" against "Proportional to microvolts input". The resistor R, connected across the coil 18, functions to correct for all power factors in the circuit. In other words, the function of the resistor R is to provide accurate cancellation of the opposed voltages due to C and M; correct values of M, C and R provide infinite rejection of the undesired adjacent channel.

Such infinite rejection is clearly shown in Fig. 2, and it will be observed that this type of characteristic is secured when the condenser C is adjusted to reject the lower adjacent channel which is 10 kc. off resonance. It may be pointed out that while the effect of the capacity coupling due to C increases with frequency the effect of the inductive coupling M decreases with frequency increase.

It may be shown mathematically that when a constant current is fed into the first of a pair of tuned circuits (as in the case of a high impedance tube such as the screen grid tubes feeding into the primary of a tuned I. F. transformer) the voltage developed across the secondary behaves as follows:

First: The voltage varies with frequency in a manner determined by the ordinary selectivity of the circuits.

Second: Superposed on this there is a relatively small variation of a nature depending on the type of coupling between circuits:

1. In case of inductive coupling the ordinary selectivity characteristic is multiplied by a factor proportional to $M/\omega$.
2. With capacity coupling as shown the factor is proportional to $C\omega$.

By making the sign of M such that the two couplings oppose it is obvious that suitable relative values of C and M may be chosen so that the total coupling is zero at any desired frequency. At the same time the actual values may be made sufficiently large so that at a given frequency difference from the above mentioned frequency the effective coupling is enough to give the desired energy transfer.

Accordingly, while no coupling exists between circuits 11 and 14 at the channel 10 kc. off resonance, coupling does exist at the I. F. The network between amplifier 12 and the demodulator 13, on the other hand, is constructed to produce the characteristics shown in Fig. 3. This characteristic is the reverse of that shown in Fig. 2, and shows the selectivity obtained when it is desired to adjust the network to reject the adjacent channel on the opposite side of the I. F. The network between the amplifier 12 and the demodulator 13 comprises the output circuit 21 of tube 12 and the input circuit 22 of the second detector 13. The circuit 21 is tuned to the I. F. and the coil 23 thereof is magnetically coupled, as at $M_1$, to the coupling coil 24 of the input circuit 22.

The input circuit 22 is tuned to the I. F., and the coupling condenser $C_1$ connects the high alternating potential points of circuits 21 and 22. It will be noted that the construction of the selector network just described is substantially similar to that preceding amplifier 12. The resistor $R_1$ is arranged in shunt to the coupling coil 24, and functions to correct for the power factors of the circuit, and thus permits accurate cancellation of the voltages induced through the opposed capacity and inductive couplings between circuits 21 and 22.

The second detector 13 is of the diode type, and the diode load resistor 24' is arranged in series between the anode of the diode and the high alternating potential side of circuit 22. The I. F.

by pass condenser 25 is connected in shunt with resistor 24'. The audio frequency component of rectified I. F. energy is transmitted to one or more stages of audio amplification followed by a reproducer. The audio component is taken off from the load resistor 24' through a path which includes the radio frequency choke 26 and the audio by pass condenser 27. The direct current component of rectified signal energy is employed for automatic volume control, termed AVC hereinafter, and this component is transmitted to the signal grids of controlled tubes.

The AVC path includes the resistor 28 connected to the junction of choke 26 and condenser 27, the lead 29 being connected to the junction of resistor 28 and condenser 30. The I. F. by pass condenser 31 is connected to ground from the audio side of choke 26, and the resistor 28 and condenser 30 function as a filter to suppress the pulsating components in the voltage transmitted over the AVC lead 29. As shown in Fig. 1, the AVC lead 29 is connected to the signal grid circuits of the amplifier 1, the first detector 5 and the I. F. amplifier 12. The connection to each signal grid circuit preferably includes a filter resistor, and it will be noted that the resistor R additionally performs the function of a filter resistor for the AVC bias. The grounded condenser 31 functions as an AVC filter condenser, and the numeral 32 denotes a switching arrangement for selectively short circuiting the coupling coil 18 when it is desired to receive strong local signals with high fidelity. The adjustable element of switch 32 is connected to a contact element 33 as shown when it is desired to have high selectivity, whereas it is connected to the tap 34 when it is desired to short circuit coil 18 for high fidelity reception. It will be noted that tap 34 is connected to the junction of coils 17 and 18, whereas the adjustable element 32 is connected to the low alternating potential side of coil 18.

Figure 3:
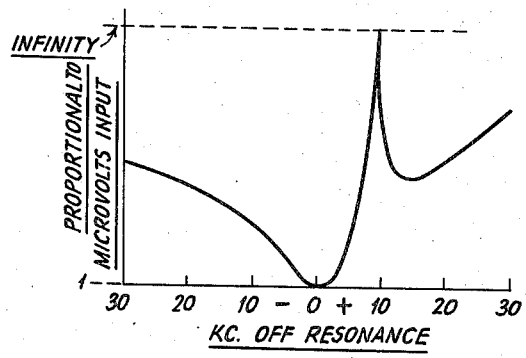
Fig. 3 shows a similar characteristic for the second I. F. selector network in Fig. 1.
Figure 4:
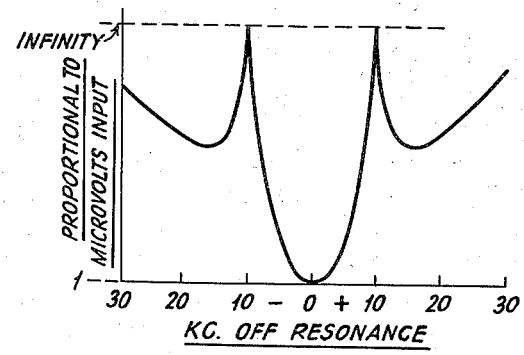
Fig. 4 illustrates the combination of the characteristics of Figs. 2 and 3 to obtain the overall I. F. selectivity characteristic.

As stated heretofore the characteristic in Fig. 3 is that of the network between amplifier 12 and diode 13. It will be observed that the upper adjacent channel, 10 kc. off resonance, has been substantially completely rejected by adjusting condenser C₁, and utilizing the proper value of resistor R₁. In Fig. 4 is shown the combination of the characteristics of Figs. 2 and 3 to produce an overall I. F. selectivity. It will be seen that infinite rejection of the adjacent channels on opposite sides of the desired I. F. has been secured. Here the adjacent carrier is eliminated before reaching the second detector, and in consequence the sidebands of the adjacent station are not heard beating with their own carrier.

Furthermore, the selectivity characteristic of Fig. 4 prevents the transmission to the audio detector of the 10 kc. heterodyne of the adjacent and desired carriers. Some interference of the adjacent sidebands modulating the desired carrier may exist. Since these are at higher audio frequencies than the notes of the desired program, they may be effectively eliminated by an approximate 5 kc. cut-off in the audio amplifier section of the receiver. It is to be clearly understood, however, that the selectivity characteristics of Figs. 2, 3 and 4 are not limited to the characteristics of selector networks positioned in the receiving system as in Fig. 1. On the contrary, the characteristics of Figs. 2, 3 and 4 are purely general, and signify the manner of designing the selectivity characteristics of cascaded fixedly tuned networks so as to secure the selectivity characteristics which are illustrated.

It is believed that the operation of the receiving system shown in Fig. 1 will be clear from the aforegoing description. The AVC arrangement functions to maintain the signal carrier amplitude at the input circuit 22 of the second detector substantially uniform regardless of amplitude variations at the collector A. The load resistor 24', and shunt condenser 25, are positioned in the high alternating potential side of the diode circuit in order to permit adjustment of coupling condenser C₁ without interlocking with tuning condenser 32. Commercial considerations will dictate the magnitudes of inductances and couplings and capacities to form the best compromises of cost, stage gain, audio band width, and 20 kc. off resonance rejection.

Merely by way of illustration there is shown in Figs. 5, 6 and 7 actual selectivity characteristics of the I. F. selector networks respectively and the overall receiver selectivity. In other words Fig. 7 shows the selectivity characteristic of a superheterodyne receiver of the type shown in Fig. 1 when embodying I. F. selector networks whose characteristics are shown in Figs. 5 and 6.

Fig. 5 shows the selectivity characteristic of the selector network between tubes 5 and 12 of the receiving system in Fig. 1, when the following circuit constants are employed:

$16=17=1.1$ mh.
Q of 16 and 17=170.
M=144 microhenrys.
R=57,000 ohms.
18=200 microhenrys.
C adjusted to 470 kc. rejection.
15 and 19 adjusted to 460 kc. resonance.
Tube $12=6D6$ of $G_m$ 1600.

From these constants it will be seen that the operating I. F. of the system, for a practical embodiment given by way of illustration, was 460 kc. The characteristic in Fig. 5 shows substantially infinite rejection of the adjacent channel on one side of resonance. In Fig. 6 is shown the selectivity characteristic of the selector network between amplifier 12 and the diode 13 for the following illustrative circuit constants:

$23=23'=1.1$ mh.
Q of 23 and $23'=170$.
$M_1=186$ microhenrys.
24=200 microhenrys.
$R_1=47,000$ ohms.
24=300,000 ohms.
Stage gain=53.

Fig. 7 shows the overall selectivity of the receiving system shown in Fig. 1, when there is compounded the characteristics of Figs. 5 and 6 with the selectivity characteristic of the collector A and the first tuned circuit 3, the selectivity characteristic being taken at an incoming signal of 1000 kc. From Fig. 7 it will be observed that the overall selectivity of the receiver is satisfactory, and provides substantially infinite rejection of adjacent channels on either side of resonance at a frequency distance of 10 kc.

An I. F. of 460 kc. has been chosen to illustrate actual selectivity characteristics, since it represents a frequency favorable to good image ratio. It is pointed out that the present infinite attenuating networks lend themselves to employment of an I. F. above the broadcast band. For example, with networks having selectivity characteristics of the type shown in Figs. 5 and 6 it is perfectly feasible and practical to utilize an I. F. having a frequency value chosen from a range of 1500 kc.

to 2000 kc. This high I. F., as is well known, practically eliminates image response for the broadcast band of 550 kc. to 1500 kc., and yet by employing selector networks of the present type satisfactory selectivity is secured.

As stated heretofore the switch 32 is provided when it is desired to receive strong local stations with high fidelity. The function of the switch is to disturb the balance of the couplings, and thus permit the selector networks to have a relatively wide transmission band. Of course, a high fidelity switch may also be provided in the network directly preceding the diode 13. Another method for obtaining high fidelity transmission bands is to stagger the tuning of the selector circuit condensers; in such a case the steep sides of the selectivity characteristics will still be preserved.

The procedure which is followed in aligning the selector network between tubes 5 and 12 is relatively simple. The coupling condenser C is adjusted, and it will be understood that it is to include some means for making such adjustment, for rejection of the desired adjacent channel. Then condensers 15 and 19 are adjusted for maximum response at the operating I. F. It is pointed out at this time that the circuit arrangement in the selector networks are such as to give a minimum of interlocking between adjustable components.

As stated previously each of the selector networks includes a resistor for correcting for the power factors of the circuit. For example, considering the network between tubes 5 and 12, the resistor R acts in the following manner. Two voltages are induced into the tank circuit comprising coils 17 and 18 and condenser 19. One of these voltages is derived through the mutual M and the other is derived through the path of condenser C. These voltages are nearly but not exactly 180 degrees out of phase. The use of resistance R diverts the current flowing through coil 17 to two paths, one through resistance R and the other through coil 18. In diverting this current the slight deviation from 180 degrees is corrected for and a discrete choice of values of R, C and M will produce infinite rejection for frequencies 10 kc. off resonance or any other degree off resonance which is desired for commercial reasons to reject.

Figure 8:
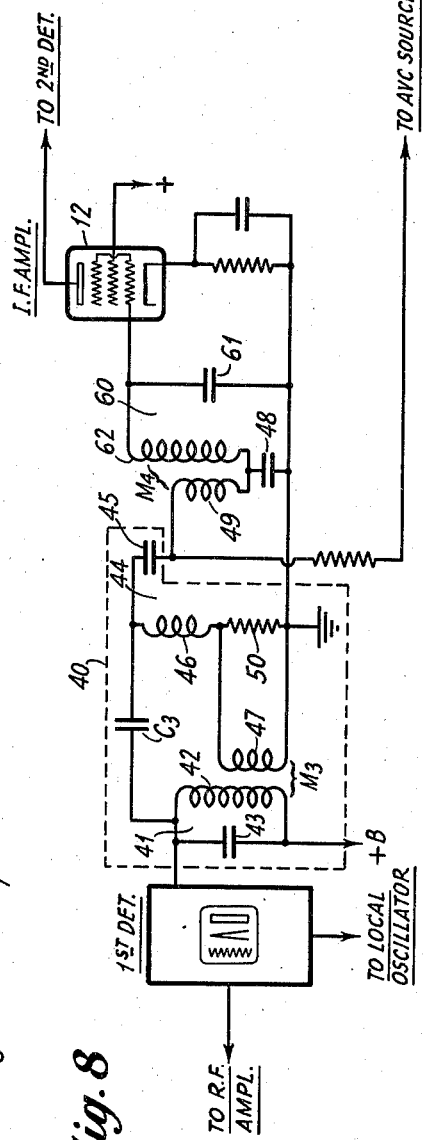
Fig. 8 is a circuit diagram of a modified form of the invention.

In Fig. 8 there is shown a modification of the invention wherein most of the total I. F. selectivity is secured in the selector network between the first detector and the I. F. amplifier 12. In other words the network following amplifier 12 in Fig. 8 is to be understood as being of the usual type. The selector network shown in Fig. 8 is a double rejection circuit which is commercial. The function of the unit disposed within the boundaries of the dotted line 40 is similar to that described in connection with the network between tubes 5 and 12 in Fig. 1. That is to say the circuit 41 is tuned to the I. F. and comprises the tuning coil 42 and tuning condenser 43. The circuit 41 is coupled to the second I. F. circuit 44, and the latter comprises the series path which consists of condenser 45, coil 46, coupling coil 47, condenser 48 and coil 49. The resistor 50, connected in shunt with coil 47, corrects for the power factors of the coupled circuits 41 and 44. The condenser $C_3$ and coupling inductance $M_3$ provide the out of phase couplings previously referred to.

The selectivity characteristic of the coupled circuits 41 and 44, assuming an I. F. of 460 kc., will show substantially infinite rejection of the adjacent channel at 470 kc. The adjacent channel on the opposite side of resonance is cut out to a commercially tolerable extent by using the third I. F. circuit 60. This circuit includes the tuning condenser 61, the coil 62 and the condenser 48. The condenser 48 and inductance $M_4$ provide the out of phase coupling paths between circuit 44 and circuit 60. The opposite adjacent channel rejection will be infinite in this case if the power factor of condenser 48 is zero. Commercial condensers having a very good power factor, such condensers can be used for condenser 48 with satisfactory adjacent channel rejection on the opposite side of resonance.

Fig. 9 shows the overall selectivity characteristic of a superheterodyne receiver which comprises in addition to the usual antenna and radio frequency stage, a typical diode detector stage. The selectivity characteristic is taken at an incoming signal of 1000 kc., and it will be observed that on one side of resonance there is substantially infinite rejection of the adjacent channel, and on the other side the rejection is sufficiently complete to be commercially tolerable. The following circuit constants are given by way of illustration for a network of the type shown in Fig. 8:

42=46=62=1.1 mh.
Q of 42, 46 and 62=170.
47=200 microhenrys.
$M_3$=185 microhenrys.
$M_4$=212 microhenrys.
48=570 micromicrofarads.
50=45,000 ohms.
Stage gain=95.

The procedure for aligning the network of Fig. 8 is as simple as that recommended in the case of Fig. 1. The condenser $C_3$ is adjusted for rejection of one adjacent channel. Condensers 43 and 45 are then adjusted for maximum response at the I. F. Condenser 48 is adjusted for the rejection of the opposite adjacent channel. Finally condensers 45 and 61 are adjusted for maximum response at the I. F. It is to be noted that the couplings $M_4$ and 48 are to be relatively adjusted until the most satisfactory adjacent channel rejection is secured.

The arrangement in Fig. 10 is illustrative of the manner of constructing a selector network of the present type, and wherein the tuning reactances are iron core inductors. As shown in Fig. 10 the selector network is one that may be substituted for the selector network between tubes 5 and 12 of Fig. 1. Thus, the numeral 70 denotes an inductor of a well known type, and whose value is adjusted by varying its core. The condenser 71 is fixed, and is not to be adjusted to set the operating frequency of the system. Similarly the tuning inductor 80 of the following selector circuit has connected across it the condenser 81. The out of phase couplings are provided by the condenser 90 and the magnetically coupled coils 91 and 92. These coils 91 and 92 may be of the adjustable iron core type so as to secure proper balancing of the capacity and inductance couplings at the adjacent channel frequency which it is desired to reject. The numeral 93 denotes the resistor which compensates for the power factors of the circuit. It is not believed necessary to describe in any further detail the functioning of this type of network. It is believed sufficient to point out that the selector networks described in Fig. 1 and Fig. 8 may be replaced by circuits wherein variations in tuning are accomplished by tuning inductors. Those skilled in the art will readily be able to devise other tuning inductor circuits from the arrangement shown in Fig. 10.

In Fig. 11 there is shown a selectivity characteristic which varies from that shown in Fig. 4 in that the points of maximum rejection are at any desired discrete distances from the operating carrier frequency. Such a selectivity characteristic may be secured by coupling various selector networks together either between several tubes, or between two tubes. In other words the cascaded selector circuits in Fig. 1 may be followed by another pair of cascaded selector circuits having maximum rejection at 20 kc. on either side of resonance; and, if desired, a third pair of cascaded selector circuits may be used wherein maximum rejection is obtained at 30 kc. on either side of resonance. Such a system will give an overall selectivity characteristic of the type shown in Fig. 11. Again, the same characteristic may be secured by cascading networks of the type shown in Fig. 8, and having maximum rejection of these networks at different frequencies off resonance. It is to be clearly understood that such cascaded networks, to give the characteristic of Fig. 11, need not be arranged in any predetermined frequency order, but it is only necessary that their various characteristics combine to give the overall characteristic of Fig. 11. It may be pointed out that a selectivity characteristic having multiple points of rejection, as shown in Fig. 11, is particularly advantageous when using an I. F. above the broadcast band.

While I have described in detail the various constructions and aspects of my present invention, and have also shown various circuit arrangements for accomplishing the functions described, it is to be clearly understood that many different circuit arrangements and modifications will be readily perceptible to those skilled in the art from the aforegoing description; such additional circuit arrangements and modifications are to be understood as coming within the scope of the appended claims.

What I claim is:

1. In combination, in a signal transmission network, a first pair of parallel tuned circuits, two reactive paths between said circuits including inductive coupling and a series coupling condenser, said paths coupling said pair of circuits in such phase opposition relation that substantially complete rejection is effected of a frequency spaced from the common operating frequency of said pair of circuits by a predetermined frequency value, a second pair of parallel tuned circuits in cascade with said first pair, two reactive paths between said circuits including inductive coupling and a series coupling condenser, said paths coupling said second pair of circuits in phase opposition and to substantially completely reject a frequency on the other side of said operating frequency which is spaced from the latter by said frequency value.

2. In a superheterodyne receiver, of the type including at least a first detector, an I. F. amplifier and a second detector, an I. F. transmission network between the first detector and I. F. amplifier, said network comprising at least two I. F. tuned circuits, means for coupling said tuned circuits in such a manner that substantially infinite rejection is produced on one side of the I. F. at a distance of approximately 10 kc., a second I. F. transmission network between the amplifier and second detector, said second network comprising at least two I. F. tuned circuits and means for coupling the latter in such a manner that substantially infinite rejection is produced on the other side of the I. F. at said distance.

3. In a superheterodyne receiver as defined in claim 2, said first network coupling means comprising capacity and magnetic coupling in out of phase relation, and a resistor disposed in at least one of the tuned circuits thereof for correcting for the power factors of the network.

4. In a superheterodyne receiver as defined in claim 2, said first network coupling means comprising capacity and magnetic coupling in out of phase relation, and means electrically associated with said first network coupling means for disturbing said phase relation when strong signals are to be received with high fidelity.

5. In a signal transmission network the combination of three parallel tuned circuits connected in cascade, each of said circuits being tuned to the same operating signal frequency, two reactive paths including inductive coupling and a series coupling condenser, said paths coupling the first and second circuits in a phase relation such that substantially infinite rejection is secured for an adjacent channel frequency on one side of said operating frequency, and two reactive paths including inductive coupling and a shunt coupling condenser, said paths coupling the second and third circuits in like phase relation such that substantially complete rejection is secured for the adjacent channel frequency on the other side of said operating frequency.

6. In a transmission network as defined in claim 5, said first coupling paths being capacitive and magnetic, a resistor being connected in shunt with said magnetic path to correct for power factors, and the second two reactive paths being capacitive and magnetic and in out of phase relation.

7. In combination with a source of signal waves and a load circuit, a wave transmission network coupling the source and load circuit, said network comprising a plurality of resonant circuits arranged in cascade, and said cascaded circuits including at least two in number, at least two reactances coupling said resonant circuits, said reactances being of opposite sign and in phase opposition at a frequency spaced from the transmitted wave frequency by a predetermined frequency value, and an impedance electrically associated with at least one of the reactances to insure substantially complete rejection at said spaced frequency.

8. In a system as defined in claim 7, said two resonant circuits being followed by at least two additional resonant circuits which are tuned to the transmitted wave frequency, at least two reactances of opposite sign, and in phase opposition, coupling the additional circuits, and said phase opposition relation of the additional circuits being at a frequency different from said spaced frequency, but other than said wave frequency.

GARRARD MOUNTJOY.